(12) United States Patent
Rozenberg et al.

(10) Patent No.: US 9,785,797 B2
(45) Date of Patent: *Oct. 10, 2017

(54) DECENTRALIZED TOKEN TABLE GENERATION

(71) Applicant: Protegrity Corporation, Grand Cayman (KY)

(72) Inventors: Yigal Rozenberg, Wilton, CT (US); Ulf Mattsson, Cos Cob, CT (US)

(73) Assignee: Protegrity Corporation, Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 15/344,583

(22) Filed: Nov. 7, 2016

(65) Prior Publication Data

US 2017/0053138 A1 Feb. 23, 2017

Related U.S. Application Data

(63) Continuation of application No. 14/611,204, filed on Jan. 31, 2015, now Pat. No. 9,514,334, which is a continuation of application No. 13/851,865, filed on Mar. 27, 2013, now Pat. No. 8,978,152.

(60) Provisional application No. 61/618,621, filed on Mar. 30, 2012.

(51) Int. Cl.
| | |
|---|---|
| *G06F 21/62* | (2013.01) |
| *H04L 29/06* | (2006.01) |
| *H04L 9/08* | (2006.01) |
| *G06F 17/30* | (2006.01) |

(52) U.S. Cl.
CPC .... *G06F 21/6254* (2013.01); *G06F 17/30339* (2013.01); *G06F 17/30424* (2013.01); *H04L 9/083* (2013.01); *H04L 63/0428* (2013.01); *H04L 63/06* (2013.01)

(58) Field of Classification Search
None
See application file for complete search history.

(56) References Cited

U.S. PATENT DOCUMENTS

| | | | |
|---|---|---|---|
| 6,449,621 B1 | 9/2002 | Pettovello | |
| 7,120,933 B2 | 10/2006 | Mattsson | |
| 7,243,304 B2 | 7/2007 | Sato | |
| 7,305,707 B2 | 12/2007 | Mattsson | |
| 8,117,219 B2 | 2/2012 | Dunki et al. | |
| 8,280,355 B1 | 10/2012 | Jones | |

(Continued)

OTHER PUBLICATIONS

Krishnamurthy, Balachander, "On the Leakage of Personally Identifiable Information via Online Social Networks", 2009, pp. 7-12.

(Continued)

*Primary Examiner* — Benjamin Lanier
(74) *Attorney, Agent, or Firm* — Fenwick & West LLP

(57) ABSTRACT

New tokenization tables are derived at intervals in order to increase the security of tokenized data that is transferred between two endpoints. Generation of the new tokenization tables is based on previous tokenization tables, which advantageously allows the generation process to be performed locally at the two endpoints independently of an external tokenization table provider. New tokenization tables can periodically be distributed to the endpoints as a new starting point for derivation.

20 Claims, 5 Drawing Sheets

(56) References Cited

U.S. PATENT DOCUMENTS

| | | | |
|---|---|---|---|
| 8,285,540 B2* | 10/2012 | Sato | G06F 17/2775 704/9 |
| 8,533,350 B2 | 9/2013 | Jakobsson et al. | |
| 8,666,812 B1 | 3/2014 | Gandhi | |
| 2001/0036224 A1* | 11/2001 | Demello | H04L 63/30 375/220 |
| 2002/0059369 A1 | 5/2002 | Kern et al. | |
| 2006/0095786 A1* | 5/2006 | Aaron | G06F 21/6263 713/184 |
| 2009/0018820 A1 | 1/2009 | Sato et al. | |
| 2009/0055267 A1 | 2/2009 | Roker | |
| 2009/0249082 A1 | 10/2009 | Mattsson | |
| 2011/0159861 A1 | 6/2011 | Pratt et al. | |
| 2011/0213807 A1 | 9/2011 | Mattsson | |
| 2013/0103685 A1 | 4/2013 | Preneel et al. | |
| 2014/0122714 A1 | 5/2014 | Jung et al. | |
| 2014/0359782 A1* | 12/2014 | Golic | H04L 63/0407 726/26 |

OTHER PUBLICATIONS

Pfitzmann, Andreas, "A terminology for talking about privacy by data minimization: Anonymity, Unlinkability, Undetectability, Unobservability, Pseudonymity, and Identity Management", 2010, pp. 1-98.

Aura, Tuomas, "Scanning Electronic Documents for Personally Identifiable Information", 2006, pp. 41-48.

Mattsson, U.T., "Format-Controlling Encryption Using Datatype-Preserving Encryption," (FCE / FCEM), 46 pages, May be retrieved at<URL:http://csrc.nist.gov/groups/ST/too lkit/BCM/ documents/ proposedmodes/foem/fcem-spec.pdf>.

McCallister, E. et al., "Guide to Protecting the Confidentiality of Personally Identifiable Information PII," NIST SP 800-122, Jan. 2009, 59 pages, May be retrieved at<URL:http://csrc.nist.gov/publications/PubsSPs.html>.

U.S. Office Action, U.S. Appl. No. 13/851,865, dated Sep. 17, 2014, 8 pages.

U.S. Office Action, U.S. Appl. No. 14/611,204, dated May 20, 2016, 7 pages.

* cited by examiner

DECENTRALIZED TOKEN TABLE GENERATION

CROSS REFERENCE TO RELATED APPLICATIONS

This application is a continuation of U.S. application Ser. No. 14/611,204, filed Jan. 31, 2015, now U.S. Pat. No. 9,514,334, which is a continuation of U.S. application Ser. No. 13/851,865, filed Mar. 27, 2013, now U.S. Pat. No. 8,978,152, which claims the benefit of Provisional Application No. 61/618,621, filed Mar. 30, 2012, all of which are incorporated herein by reference.

FIELD OF ART

This application relates generally to security in mobile or distributed environments, and more specifically to tokenization and the generation of token tables.

BACKGROUND

Many challenges exist in handling financial and other sensitive data, such as credit card numbers, social security numbers, bank account numbers, and the like. To prevent unauthorized access to sensitive data, steps can be taken to protect the sensitive data. Such data protection measures are required by many jurisdictions for various categories of sensitive data. The sensitive data can be encrypted during transmission or storage using an encryption algorithm and encryption key. However, encryption can be overcome/broken using a variety of hacking methods, and the use of encryption in financial systems is often subject to resource-intensive audit requirements. Data storage security measures can be implemented while the sensitive data is stored at an authorized entity, but such storage security measures generally protect against intrusion by an unauthorized entity and do not protect the sensitive data after the unauthorized entity has overridden or bypassed the storage security measures.

SUMMARY

In a tokenization environment, sensitive data is tokenized using a token table prior to being sent from a transmitting endpoint to a receiving endpoint. The transmitting endpoint and the receiving endpoint maintain the same token table so that the receiving endpoint can detokenize the tokenized sensitive data upon receiving the tokenized data from the transmitting endpoint. Since only tokenized data is transmitted, an unauthorized entity who intercepts a transmission is unable to recreate the sensitive data if the entity does not have a copy of the token table.

To increase the security level of the tokenized data, new token tables are generated at the end of regeneration intervals so as to limit the use of any one token table. The generation of the new token tables is based on previous token tables, which allows the generation process to occur locally at the two endpoints. This advantageously allows the token tables to be changed at both endpoints without having to send the token table to the endpoints and risk having the token table be intercepted.

In one embodiment, a new token table is generated by performing a shuffle algorithm that generates a permutation of the tokens in the previous token table. The shuffle algorithm determines the permutation of the tokens using a pseudo-random number generator and a seed value that can be distributed to the endpoints. If both the transmitting endpoint and the receiving endpoint use the same seed value to perform the shuffle algorithm on the same token table, then the new tables generated at the two endpoints will also be the same.

Figure 1:
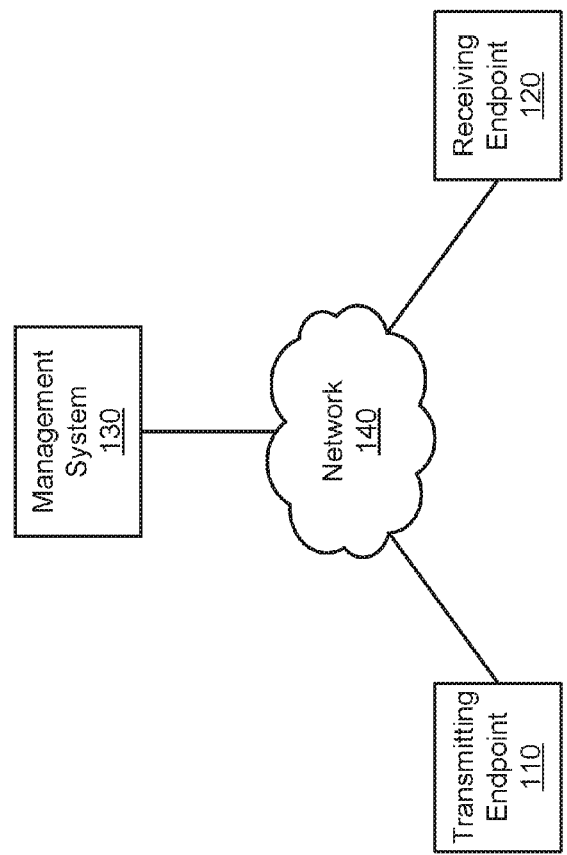
FIG. 1 illustrates a tokenization environment, according to one embodiment.

The figures depict embodiments for purposes of illustration only. One skilled in the art will readily recognize from the following description that alternative embodiments of the structures and methods illustrated herein may be employed without departing from the principles of the invention described herein.

DETAILED DESCRIPTION

Tokenization Overview

As used herein, the tokenization of data refers to the generation of tokenized data by querying one or more token tables mapping input values to tokens with one or more portions of the data, and replacing the queried portions of the data with the resulting tokens from the token tables. Tokenization can be combined with encryption for increased security, for example by encrypting sensitive data using a mathematically reversible cryptographic function (e.g., datatype-preserving encryption or DTP), a one-way non-reversible cryptographic function (e.g., a hash function with strong, secret salt), or a similar encryption before or after the tokenization of the sensitive data. Any suitable type of encryption can be used in the tokenization of data.

As used herein, the term token refers to a string of characters mapped to an input string of characters in a token table, used as a substitute for the string of characters in the creation of tokenized data. A token may have the same number of characters as the string being replaced, or can have a different number of characters. Further, the token may have characters of the same type (such as numeric, symbolic, or alphanumeric characters) as the string of characters being replaced or characters of a different type. Tokens can be randomly generated and assigned to a particular token table input value.

Any type of tokenization may be used to perform the functionalities described herein. One such type of tokenization is static lookup table ("SLT") tokenization. SLT tokenization maps each possible input value (e.g., possible character combinations of a string of characters) to a particular token. An SLT includes a first column comprising permutations of input string values, and may include every possible input string value. The second column of an SLT includes tokens, with each associated with an input string value of the first column. Each token in the second column may be unique among the tokens in the second column. Optionally, the SLT may also include one or several additional columns with additional tokens mapped to the input string values of the first column. A seed value can be used to generate an SLT, for instance by generating random numbers based on the seed value for each token in the SLT.

In some embodiments, to increase the security of tokenization, sensitive data can be tokenized two or more times using the same or additional token tables. Each successive tokenization is referred to as a "tokenization iteration" herein. For example, the first 8 digits of a 16 digit credit card number can be tokenized with an 8 digit token table to form first tokenized data, and the last 12 digits of the first tokenized data can be tokenized using a 12 digit token table to form second tokenized data. In another example, the first 4 digits of a credit card number are tokenized using a first token table, the second 4 digits are tokenized with a second token table, the third 4 digits are tokenized with a third token table, and the last 4 digits are tokenized with a fourth token table. Certain sections of the sensitive data may also be left un-tokenized; thus a first subset of the resulting tokenized data may contain portions of the sensitive data and a second subset of the tokenized data may contain a tokenized version of the sensitive data.

The security of tokenization can be further increased through the use of initialization vectors ("IVs"). An IV is a string of data used to modify sensitive data prior to tokenizing the sensitive data. Example sensitive data modification operations include performing linear or modulus addition on the IV and the sensitive data, performing logical operations on the sensitive data with the IV, encrypting the sensitive data using the IV as an encryption key, and the like. The IV can be a portion of the sensitive data. For example, for a 12-digit number, the last 4 digits can be used as an IV to modify the first 8 digits before tokenization. IVs can also be retrieved from an IV table, received from an external entity configured to provide IVs for use in tokenization, or can be generated based on, for instance, the identity of a user, the date/time of a requested tokenization operation, based on various tokenization parameters, and the like. Data modified by one or more IVs that is subsequently tokenized includes an extra layer of security—an unauthorized party that gains access to the token tables used to tokenized the modified data will be able to detokenize the tokenized data, but will be unable to de-modify the modified data without access to the IVs used to modify the data.

As used herein, "tokenization parameters" refers to the properties or characteristics of a tokenization operation. For example, tokenizing data according to tokenization parameters can refer to but is not limited to one or more of the following: the generation of token tables for use in tokenizing the data; the identity of pre-generated token tables for use in tokenizing the data; the type and number of token tables for use in tokenizing the data; the number of tokenization iterations to perform; the type, number, and source of initialization vectors for use in modifying the data prior to tokenization; and encryption operations to perform on the data before or after tokenization. Tokenization and initialization vectors are described in greater detail in U.S. patent application Ser. No. 13/595,438, titled "Multiple Table Tokenization", filed Aug. 27, 2012, the contents of which are hereby incorporated by reference.

Tokenization Environment Overview

FIG. 1 illustrates a tokenization environment 100, according to one embodiment. The tokenization environment includes a transmitting endpoint 110, a receiving endpoint 120, and a management system 130. The two endpoints 110, 120 and the management system 130 are connected to each other via a network 140.

The transmitting endpoint 110 tokenizes sensitive data prior to the transmission of the data from the transmitting endpoint 110 to the receiving endpoint 120. Similarly, the receiving endpoint 120 detokenizes tokenized data received at the receiving endpoint 120 from the transmitting endpoint 110. In one embodiment, the transmitting endpoint 110 tokenizes data using a token table and transmits the tokenized data to the receiving endpoint 120. After receiving the tokenized data, the receiving endpoint 120 detokenizes the tokenized data using a matching token table to generate the original sensitive data.

Although not shown in FIG. 1, the endpoints 110, 120 can also include components such as a computer processor that executes computer-readable instructions, a memory that holds instructions and data used by the processor, a network adapter that couples the endpoint 110, 120 to the network 140, and input/output controllers that interface with input devices (e.g., a keyboard, mouse, or touchscreen) and output devices (e.g., a display). In one embodiment, the functionality of the endpoints 110, 120 as described herein is implemented as computer-readable instructions stored in the memory of the corresponding endpoint 110, 120. In another embodiment, some or all of the functionality of the endpoints 110, 120 are implemented as hardware.

The management system 130 manages the endpoints 110, 120 so that the endpoints 110, 120 are able to maintain matching token tables. In one embodiment, the functions of the management system 130 are implemented in a server computing system that communicates with the endpoints 110, 120 over the network 140.

The network 140 is typically the Internet, but may be any network, including but not limited to a LAN, a MAN, a WAN, a mobile wired or wireless network, a private network, a virtual private network, a direct communication line, and the like. The network 140 can be a combination of multiple different networks. In such embodiments, the tokenization environment 100 can be implemented at, within, or co-located with an entity illustrated in FIG. 1, and can include both inner- and inter-entity communication lines.

Although the tokenization environment 100 of FIG. 1 only contains two endpoints 110, 120, the tokenization environment 100 may also include additional endpoints that transmit and receive tokenized data. For example, multiple transmitting endpoints 110 may transmit tokenized data to a single receiving endpoint 120. An example with multiple transmitting endpoints 110 is described with reference to FIG. 2B. Alternatively, multiple transmitting endpoints 110 may transmit tokenized data to multiple receiving endpoints 120. An endpoint may also be configured to both transmit and receive tokenized data. For example, an endpoint may include a system that performs the functions of both a transmitting endpoint 110 and a receiving endpoint 120.

Figure 2A:
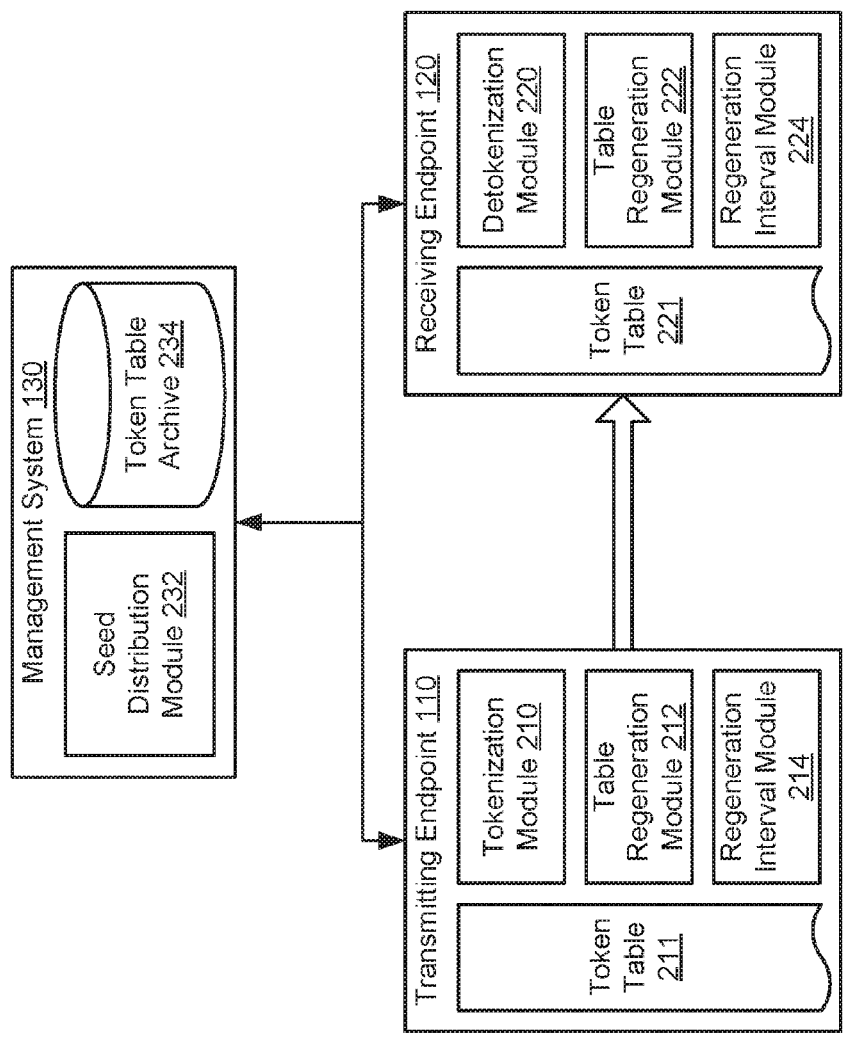
FIG. 2A is a block diagram illustrating a tokenization environment in detail, according to one embodiment.

FIG. 2A is a block diagram illustrating a tokenization environment 200 in detail, according to one embodiment. The tokenization environment 200 of FIG. 2A includes a transmitting endpoint 110, a receiving endpoint 120, and a management system 130. The endpoints 110, 120 each contain a token table 211, 221, a table regeneration module 212, 222, and a regeneration interval module 214, 224. The transmitting endpoint 110 further includes a tokenization module 210, and the receiving endpoint 120 further includes a detokenization module 220. In other embodiments, the endpoints 110, 120 may include additional, fewer or different components. The functions of the components described herein may also be distributed among the components of the endpoints 110, 120 in a different manner. For instance, the functions of the regeneration interval module 214, 224 may be integrated into the table regeneration module 212, 222.

As described above, the token tables 211, 221 are lookup tables that map input strings to tokens. The tokenization module 210 receives sensitive data and tokenizes sensitive data using the tokenization table 211 to generate tokenized data representing the sensitive data. Similarly, the detokenization module 220 receives tokenized data and detokenizes the tokenized data using the tokenization table 221 to recreate sensitive data.

The token table 211 that is used to generate tokenized data at the transmitting endpoint 110 has the same contents as the token table 221 used to recreate the sensitive data. Thus, an input string in the token table 211 is associated with the same token as the corresponding input string in the token table 221. In addition, although the endpoints 211, 221 are only shown with a single token table, the two endpoints 211, 221 can include multiple token tables. For example, each endpoint 211, 221 can include a set of token tables that are used during the same regeneration interval, with each token table in the set including mappings for a different set of input strings. Alternatively, each token table includes mappings for the same set of input strings, and different token tables are used to tokenize different portions of a transmission.

Similarly, one or both endpoints 110, 120 can simultaneously maintain token tables for use during multiple regeneration intervals. For example, the transmitting endpoint 110 may maintain three token tables at once, where the first token table is used during a first regeneration interval, the second token table is used during a second regeneration interval, and the third token table is used during a third regeneration interval. All three token tables may be regenerated after the end of the third regeneration interval. Similarly, the receiving endpoint 120 may maintain the same three token tables at once. In this example, the transmitting endpoint 110 may include an identifier for any token tables used in tokenizing data with each transmission of the tokenized data. Alternatively, the receiving endpoint 120 can request any needed identifiers from the transmitting endpoint 110 after receiving the tokenized data.

The table regeneration modules 212, 222 regenerate the token tables 211, 221 at intervals so as to limit the use of each token table 211, 221. During the regeneration process, the table regeneration module 212, 222 generates a new token table at the corresponding endpoint 110, 120 and replaces the previous token table with the new token table. This beneficially increases the security level of the tokenization environment 200 by limiting the amount of tokenized data that can be compromised when a particular token table 211, 221 is compromised. To further increase the security level of the tokenization environment 200, the previous token tables can be deleted from the systems 112, 122 after the new token tables are generated.

In one embodiment, the table regeneration modules 212, 222 generate a new token table by performing a shuffle algorithm on the mapping defined in the previous token table to generate a new mapping between input strings and tokens. For example, the modules 212, 222 use the Fisher-Yates shuffle (also known as the Knuth shuffle) to generate a random permutation of the tokens in the previous token table and save a new token table in which the same input character strings are mapped to the permuted tokens. In an embodiment where the token tables are static lookup tables as described above, the shuffle algorithm generates a random permutation by iterating through each token in the second column of the previous token table and swapping the token with a randomly-chosen token in the previous token table. A pseudo-random number generation (PRNG) algorithm can be used to select the randomly-chosen element based on a seed value. In another embodiment, a different shuffle algorithm is used to generate a random permutation of a previous token table based on a seed value.

In another embodiment, the table regeneration modules 212, 222 are able to perform multiple different shuffle algorithms. In this embodiment, both table regeneration modules 212, 222 maintain a lookup table that associates each shuffle algorithm with a shuffle identifier value. The table regeneration modules 212, 222 can then be configured to receive a shuffle identifier and perform the associated shuffle algorithm. The shuffle identifier can be selected at the endpoint 110, 120, received from the other endpoint 110, 120, or received from the management system 130. If the lookup table remains secret, this embodiment advantageously prevents an unauthorized entity from determining which shuffle algorithm will be used even if the shuffle identifier is compromised.

The regeneration interval modules 214, 224 monitor the usage of the token tables 211, 221 to determine the intervals at which the token tables 211, 221 are regenerated. When the regeneration interval module 214, 224 detects that the usage of a token table 114, 124 has exceeded a usage limit or threshold value, the regeneration interval module 214, 224 sends an instruction to the table regeneration module 212, 222 to regenerate the token table 114, 124.

The usage limit can be based on a wide variety of criteria, such as a number of transmissions of tokenized data, an amount of tokenized data transmitted or received, a number of tokenization or detokenization operations performed, a length of time a token table is used, or an interval based on some other type of suitable metric. For example, the regeneration interval modules 214, 224 can instruct the table regeneration module 212, 222 to regenerate the token tables 114, 124 after one million transmissions of tokenized data, after transmitting or receiving one gigabyte of tokenized data, or after using a token table for one hour. In one embodiment, a combination of different metrics is used. For example, the regeneration interval modules 214, 224 may be configured to send a regeneration instruction to the table regeneration modules 212, 222 after one million transmissions of tokenized data or after a token table is used for one hour (even if fewer than one million transmissions have been made during that hour). The usage limit may also be set as a rate. For example, the regeneration interval module 214, 224 sends a regeneration instruction if the number of tokens transmitted or received per hour exceeds a set threshold, such as 100,000 tokens per hour.

In one embodiment, the regeneration of the token tables 211, 221 is staggered so that one table regeneration module generates a new token table before the other table generation module. In this embodiment, the regeneration interval module 214 at the transmitting endpoint 110 sends a regeneration instruction after detecting that a regeneration interval (defined under any of the criteria described above) has ended. Meanwhile, the regeneration interval module 224 at the detokenization system 122 sends a regeneration instruction on an as-needed basis. For example, the module 224 sends a regeneration instruction after detecting that the receiving endpoint 120 has started receiving data that was tokenized with a new token table 211. Regenerating the token tables 211, 221 in this manner can be advantageous because the regeneration interval module 214 at the transmitting endpoint 110 can dynamically change the regeneration interval or use a regeneration interval based on a metric that is not available at the receiving endpoint 120.

The tokenization environment 200 also includes a management system 130 that coordinates the regeneration of the token tables 211, 221 so that the endpoints 110, 120 have matching token tables 211, 221 after each regeneration process. In the illustrated embodiment, the management system 130 includes a seed distribution module 232 and a token table archive 234. In other embodiments, the management system 130 may include additional, fewer, or different components.

The seed distribution module 232 distributes the same seed value to the endpoints 110, 120 so that the table regeneration modules 212, 222 can both perform the shuffle algorithm based on the same seed value to produce the same result. In one embodiment, the seed distribution module 232 is configured to send a seed value to the endpoints 110, 120 at the end of each regeneration interval. Alternatively, the module 232 can send the seed value ahead of time. In an embodiment where the module 232 sends the seed value ahead of time, the module 232 can also send data specifying a regeneration interval to one or both of the endpoints 110, 120 to designate that the seed value is to be used after the specified regeneration interval. Sending the seed value ahead of time beneficially allows the endpoints 110, 120 to regenerate the token tables 211, 221 locally regardless of whether the endpoints 110, 120 have an active connection to the management system 130 at the end of a regeneration interval. The endpoints 110, 120 are able to generate matching token tables 211, 221 as long as the table regeneration modules 212, 222 use the same seed value in the same PRNG algorithm.

The seed distribution module 232 can also send multiple seed values to the endpoints 110, 120 at once. This allows the endpoints 110, 120 to independently regenerate their respective token tables 211, 221 without having to reestablish a connection with the management system 130 at the end of each regeneration interval. For example, if the seed distribution module 232 sends three seed values to the endpoints 110, 120, the endpoints 110, 120 can disconnect from the management system 130 and regenerate their respective token tables 211, 221 three times before reconnecting to the management system 130.

In an alternative embodiment, the seed distribution module 232 distributes a seed identifier instead of a seed value to the endpoints 110, 120. The seed identifier identifies an item of data on the endpoints 110, 120 that is to be used as the seed value during a regeneration interval. For example, the seed identifier can indicate that a specific data item to be tokenized (e.g., the $100^{th}$ data item that is tokenized during a regeneration interval) is to be used as the seed value for the next regeneration operation. Alternatively, the seed identifier can indicate that the resulting token for a specific data item is to be used as the seed value. This is advantageous because even if the seed identifier is compromised, an unauthorized entity would have to track every data item sent between the endpoints 110, 120 to determine the seed value.

In one embodiment, the management system 130 also maintains a token table archive 234 that includes the token table currently being used at the endpoints 110, 120 and one or more token tables that were previously used at the endpoints. In this embodiment, the management system 130 may also include a table regeneration module and a regeneration interval module so that the management system 130 can regenerate new token tables independently of the endpoints 110, 120.

The management system 130 can also be configured to periodically generate and send a new token table (i.e., not derived from any previous token table) to the endpoints 110, 120 and instruct the endpoints 110, 120 to use the new token tables as a new starting point for the regeneration process. New token tables can be sent after a fixed number of regeneration intervals, after a predefined length of time, or after some other triggering condition is satisfied. In one embodiment, the endpoints 110, 120 continue to use seed values received from the seed distribution module 232 when performing regeneration operations on the new token tables. In this embodiment, the previous token tables may be deleted from the endpoints 110, 120. In another embodiment, the endpoints 110, 120 use the previous token tables in addition to seed values received from the seed distribution module 232 when performing regeneration operations on the new token tables.

In one embodiment, the management system 130 includes a table regeneration module and the seed distribution module 232 is implemented at one or more of the systems 112, 122 rather than at the management system 130. In this embodiment, the table regeneration module on the management system 130 regenerates token tables using seed values received from the systems 112, 122 (e.g., by performing a shuffle algorithm), and the management system 130 sends new token tables back to the systems 112, 122. In another embodiment, the management system 130 generates new token tables based on seed values generated locally and sends the new token tables to the systems 112, 122. In this embodiment, the management system 130 can send new token tables to the systems 112, 122 without receiving any seed values from the systems 112, 122 beforehand. Any transmission of seed values and/or new token tables between the management systems 130 and the systems 112, 122 may be secured, either by tokenizing the data with the previous token table, by using some other data security technique, such as encryption, or through some combination of tokenization and other techniques.

Figure 2B:
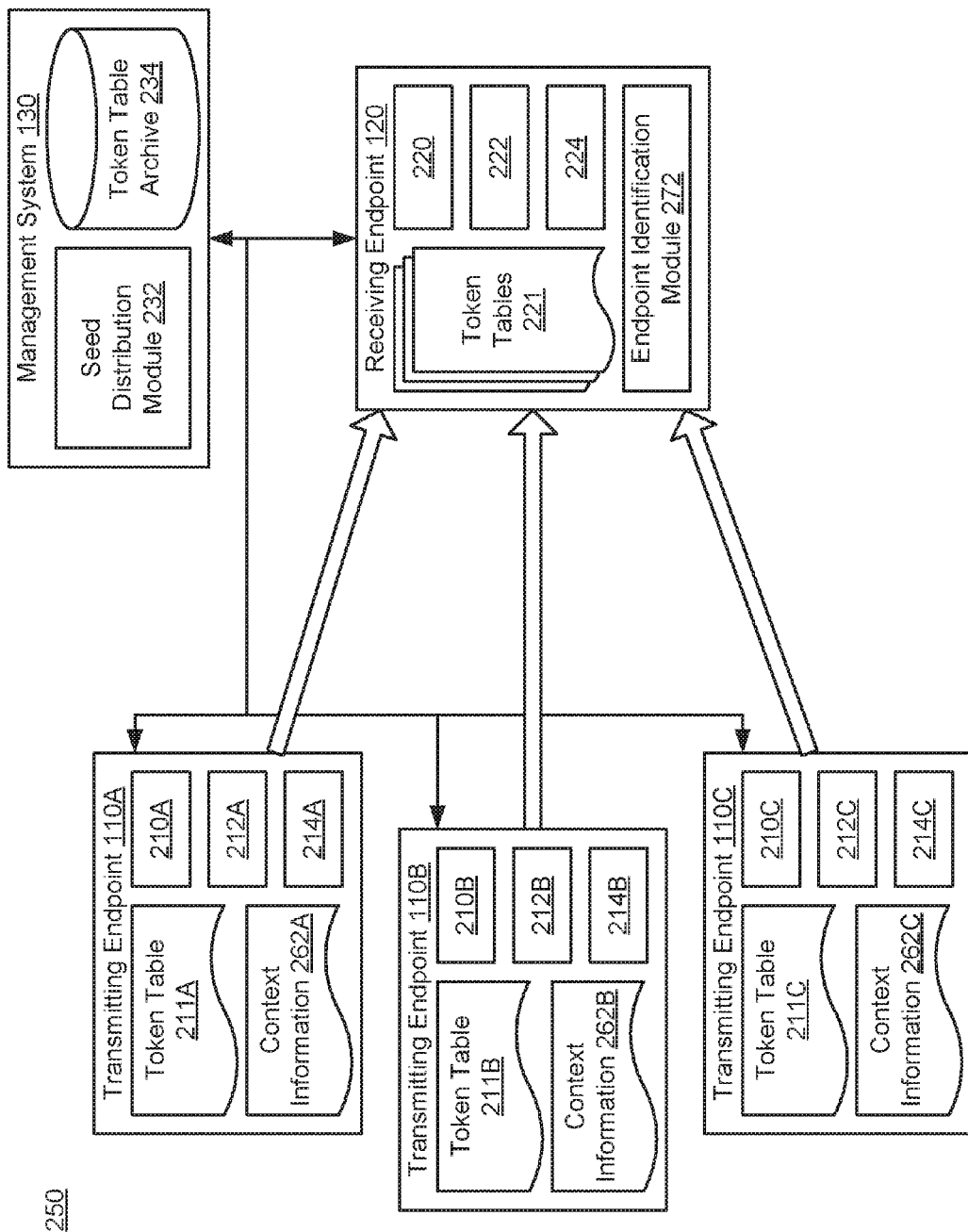
FIG. 2B is a block diagram illustrating a tokenization environment in detail, according to another embodiment.

FIG. 2B is a block diagram illustrating a tokenization environment 250 in detail, according to another embodiment. In the embodiment illustrated in FIG. 2B, multiple transmitting endpoints 110A through 110C send tokenized data to a single receiving endpoint 120. For example, the embodiment of FIG. 2B may represent multiple remote payment terminals transmitting tokenized payment data to a single payment processing system.

Each transmitting endpoint 110 includes a tokenization module 210, a token table 211, a table regeneration module 212, and a regeneration interval module 214. The modules 210, 212, 214 have similar functions as the corresponding modules described with reference to FIG. 2A. In one embodiment, each transmitting endpoint 110 maintains the same token table 211. In another embodiment, the transmitting endpoints 110 maintain different token tables 211. Alternatively, groups of transmitting endpoint 110 maintain the same token table. For example, the first two transmitting endpoints 110A, 110B maintain the same token table 211A, 211B, and the third transmitting endpoint 110C maintains a different token table 211C.

In embodiments where the transmitting endpoints 110 maintain different token tables 211, context information 262 describing various tokenization parameters can be included within or transmitted with tokenized data sent by the transmitting endpoints 110. The context information 262 is data that identifies the token table 211 that is being used at the corresponding transmitting endpoint 110, that identifies the transmitting endpoint 110 itself, that identifies the time or date of tokenization, that identifies the data being tokenized, and the like. For example, the context information 262 can include a user-defined identifier string, an index value corresponding to the token table being used, or an identifier for an initial token table and a number specifying the number of regeneration operations performed based on the initial token table. The context information can be included with tokenized data sent by the transmitting endpoint 110 to the receiving endpoint 120. Alternatively, the receiving endpoint 120 may request the context information 262 after receiving tokenized data from a transmitting endpoint 110. Upon receiving the context information 262, the endpoint identification module 272 on the receiving endpoint uses the context information 262 to identify the token table used to tokenize the tokenized data, the transmitting endpoint 110 that generated and sent the corresponding tokenized data, and the like.

The context information 262 can also be used during the regeneration process for the token tables 211. For example, context information 262 can include a seed value for a PRNG algorithm in the table regeneration module 210, and the seed value can subsequently be sent to the detokenization system 122 so that the table regeneration module 220 can generate a matching tokenization table. Although not shown in FIG. 2B, the receiving endpoint 120 may also maintain a similar range of context information and use its context information in a similar manner. Similarly, the endpoints 110, 120 of FIG. 2A may also maintain context information.

Generation of Token Tables

Figure 3A:
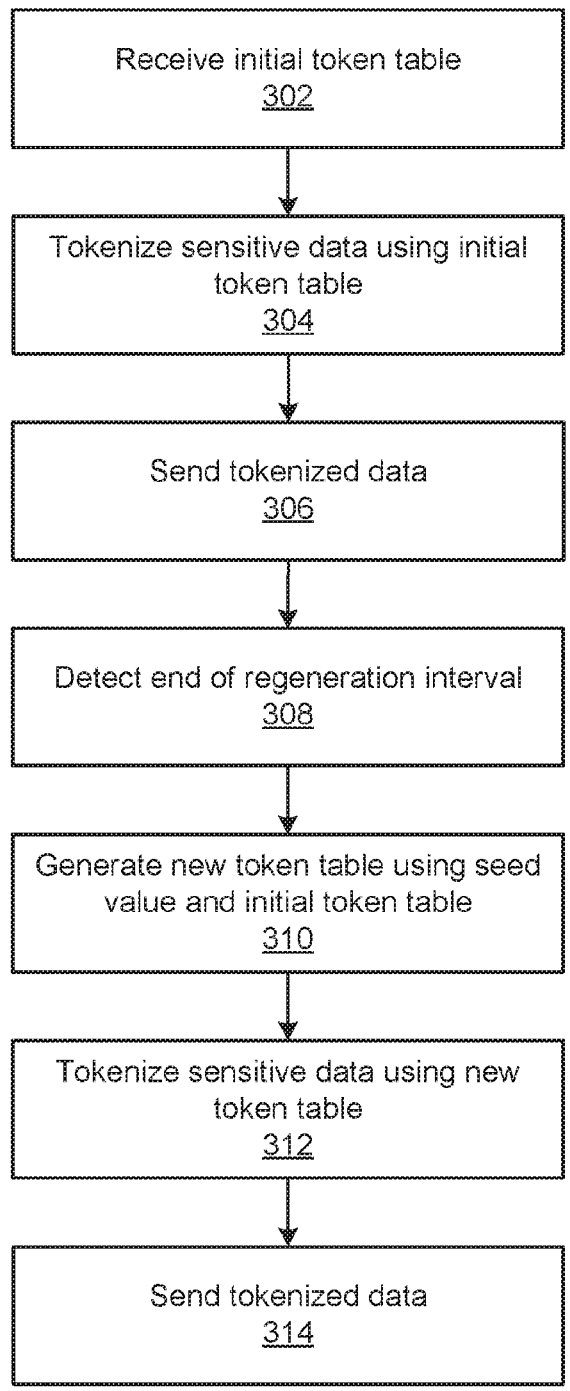
FIG. 3A is a flowchart of a process for generating a token table and using the token table to tokenize sensitive data, according to one embodiment.

FIG. 3A is a flowchart of a process 300 for generating a token table and using the token table to tokenize sensitive data at a transmitting endpoint 110, according to one embodiment. In one embodiment, the transmitting endpoint 110 receives 302 an initial token table from the management system 130, and the tokenization module 210 begins tokenizing 304 sensitive data using the initial token table. In another embodiment, the transmitting endpoint 110 generates the initial token table locally. For example, the table regeneration module 212 receives an initial seed value from the management system and performs a shuffle algorithm on a default token table (e.g., a table in which each input character string is mapped to a token that is same as the input character string, or a table in which the tokens are a sequence of consecutive integers) to generate the initial token table.

As described above, the tokenization module 210 may incorporate additional data security techniques (e.g., encryption) when tokenizing data. After the tokenization module 210 generates the tokenized data, the transmitting endpoint 110 sends 306 the tokenized data to the receiving endpoint 120. In some embodiments, the transmitting endpoint 110 may also include context information 262 with transmissions of tokenized data so that the receiving endpoint 120 can identify the token table. The steps 304, 306 for tokenizing sensitive data and sending the tokenized data can be repeated until the regeneration interval ends.

When the regeneration interval module 214 detects 308 that the regeneration interval has ended, the module 214 sends a regeneration instruction to the table regeneration module 212. The regeneration instruction causes the table regeneration module 212 to generate 310 a new token table using a seed value and the initial token table. For example, the table regeneration module 212 uses a shuffle algorithm to generate a random permutation of the previous token table. As described above, the seed value may be received from the management system 130 at the end of the regeneration interval, received from the management system 130 beforehand, or generated at the transmitting endpoint 110.

After the new token table is generated 310, the tokenization module 210 tokenizes 312 sensitive data using the new token table, and the transmitting endpoint 110 sends 314 the tokenized data to the receiving endpoint 120. The steps 312, 314 can also be repeated multiple times to tokenize and send additional transmissions to the receiving endpoint 120.

Figure 3B:
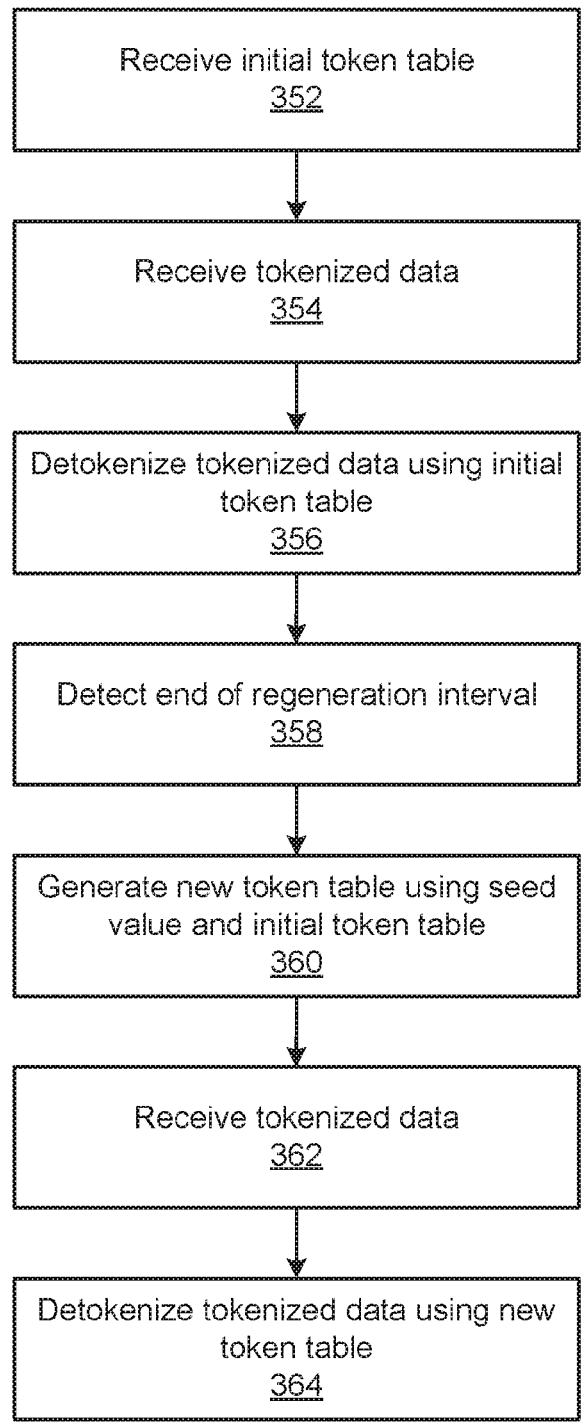
FIG. 3B is a flowchart of a process for generating a token table and using the token table to detokenize tokenized data, according to one embodiment.

FIG. 3B is a flowchart of a process 350 for generating a token table and using the token table to detokenize tokenized data at a receiving endpoint 120, according to one embodiment. In one embodiment, receiving endpoint 120 receives 352 an initial token table from the management system 130. In embodiments where the transmitting endpoint 110 generates the initial token table locally, the receiving endpoint 120 may also the initial token table locally in the same manner. For example, the table regeneration module 222 receives the same initial seed value from the management system 130 and uses the initial seed value to perform the same shuffle algorithm on the same initial token table that was used at the transmitting endpoint 110.

After the receiving endpoint 120 receives 354 tokenized data from a transmitting endpoint 110, the detokenization module 220 detokenizes 356 the received tokenized data using the initial token table. The steps 354 and 356 for receiving and detokenizing data can be repeated as the receiving endpoint 120 receives transmissions from the transmitting endpoints 110 during the regeneration interval.

In embodiments where the receiving endpoint 120 receives transmissions from multiple transmitting endpoints 110, the receiving endpoint 120 may receive 352 multiple token tables from the management system 130. In these embodiments, the receiving endpoint 120 also receives context information 262 identifying various tokenization parameters from the transmitting endpoints, and the endpoint identification module 272 analyzes the context information 262 to determine which token table to use in detokenizing 356 received transmissions.

When the regeneration interval module 224 detects 358 that the regeneration interval has ended, the module 224 sends a regeneration instruction to the table regeneration module 222 and the table regeneration module 222 generates 360 a new token table using a seed value and the initial token table. When the receiving endpoint 120 receives 362 tokenized data after the new token table is generated, the detokenization module 220 detokenizes 364 the received data using the new token table.

In an alternative embodiment, the endpoints 110, 120 receive 302, 352 an initial token table, and each subsequent token table is generated by applying the regeneration process 310, 360 to the initial token table multiple times. The number of regeneration operations may be based on the number of regeneration intervals that have elapsed. For example, the initial token tables may be regenerated only once at the end of the first interval, regenerated twice at the end of the second interval, and so on. If the same seed value (or series of seed values) is used at each endpoint, this iterative regeneration technique can also be performed locally at each endpoint and at the management system to generate matching token tables at each device.

Additional Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for tokenizing data, comprising:
generating, by a transmitting endpoint configured to tokenize data using a first token table accessible to both the transmitting endpoint and a receiving endpoint communicatively coupled to the transmitting endpoint, the first token table mapping each of a plurality of input values to a different token value, a second token table based on the first token table and a seed value, the second token table mapping one or more of the plurality of input values to different token values than the first token table, wherein each input value included in the first token table is also included in the second token table;
receiving, by the transmitting endpoint, input data;
tokenizing, by the transmitting endpoint, the input data by querying the second token table with a portion of the input data to identify a token value mapped to the value of the portion of the input data and replacing the portion of the input data with the token value to produce tokenized data; and
providing, by the transmitting endpoint, the tokenized data and the seed value to a receiving endpoint, the receiving endpoint configured to generate the second token table based on the first token table and the seed value, wherein the receiving endpoint does not have access to the seed value before receiving the seed value from the transmitting endpoint.

2. The method of claim 1, wherein generating the second token table comprises performing a shuffle algorithm to generate a permutation of the tokens in the first token table, the permutation generated with the pseudo-random number generator and the seed value.

3. The method of claim 2, wherein the pseudo-random number generator is seeded using the seed value.

4. The method of claim 1, wherein the second token table is generated in response to determining that the transmitting endpoint has transmitted a threshold number of tokenized data to the receiving endpoint.

5. The method of claim 1, wherein the second token table is generated in response to determining that the transmitting endpoint has transmitted a threshold amount of tokenized data to the receiving endpoint.

6. The method of claim 1, wherein the transmitting endpoint is configured to also provide an identity of the first token table to the receiving endpoint.

7. The method of claim 1, wherein at least one token value of the second token table is not included in the first token table.

8. A system for tokenizing data, the system comprising a non-transitory computer-readable storage medium storing executable computer instructions and a processor configured to execute the instructions to perform steps comprising:
generating, by a transmitting endpoint of the system configured to tokenize data using a first token table accessible to both the transmitting endpoint and a receiving endpoint communicatively coupled to the transmitting endpoint, the first token table mapping each of a plurality of input values to a different token value, a second token table based on the first token table and a seed value, the second token table mapping one or more of the plurality of input values to different token values than the first token table, wherein each input value included in the first token table is also included in the second token table;

receiving, by the transmitting endpoint, input data;

tokenizing, by the transmitting endpoint, the input data by querying the second token table with a portion of the input data to identify a token value mapped to the value of the portion of the input data and replacing the portion of the input data with the token value to produce tokenized data; and providing, by the transmitting endpoint, the tokenized data and the seed value to a receiving endpoint, the receiving endpoint configured to generate the second token table based on the first token table and the seed value, wherein the receiving endpoint does not have access to the seed value before receiving the seed value from the transmitting endpoint.

9. The system of claim 8, wherein generating the second token table comprises performing a shuffle algorithm to generate a permutation of the tokens in the first token table, the permutation generated with the pseudo-random number generator and the seed value.

10. The system of claim 9, wherein the pseudo-random number generator is seeded using the seed value.

11. The system of claim 8, wherein the second token table is generated in response to determining that the transmitting endpoint has transmitted a threshold number of tokenized data to the receiving endpoint.

12. The system of claim 8, wherein the second token table is generated in response to determining that the transmitting endpoint has transmitted a threshold amount of tokenized data to the receiving endpoint.

13. The system of claim 8, wherein the transmitting endpoint is configured to also provide an identity of the first token table to the receiving endpoint.

14. The system of claim 8, wherein at least one token value of the second token table is not included in the first token table.

15. A non-transitory computer-readable storage medium storing executable computer instructions for tokenizing data, the instructions, when executed, configured to perform steps comprising:

generating, by a transmitting endpoint configured to tokenize data using a first token table accessible to both the transmitting endpoint and a receiving endpoint communicatively coupled to the transmitting endpoint, the first token table mapping each of a plurality of input values to a different token value, a second token table based on the first token table and a seed value, the second token table mapping one or more of the plurality of input values to different token values than the first token table, wherein each input value included in the first token table is also included in the second token table;

receiving, by the transmitting endpoint, input data;

tokenizing, by the transmitting endpoint, the input data by querying the second token table with a portion of the input data to identify a token value mapped to the value of the portion of the input data and replacing the portion of the input data with the token value to produce tokenized data; and providing, by the transmitting endpoint, the tokenized data and the seed value to a receiving endpoint, the receiving endpoint configured to generate the second token table based on the first token table and the seed value, wherein the receiving endpoint does not have access to the seed value before receiving the seed value from the transmitting endpoint.

16. The computer-readable storage medium of claim 15, wherein generating the second token table comprises performing a shuffle algorithm to generate a permutation of the tokens in the first token table, the permutation generated with the pseudo-random number generator and the seed value.

17. The computer-readable storage medium of claim 16, wherein the pseudo-random number generator is seeded using the seed value.

18. The computer-readable storage medium of claim 15, wherein the second token table is generated in response to determining that the transmitting endpoint has transmitted a threshold number of tokenized data to the receiving endpoint.

19. The computer-readable storage medium of claim 15, wherein the second token table is generated in response to determining that the transmitting endpoint has transmitted a threshold amount of tokenized data to the receiving endpoint.

20. The computer-readable storage medium of claim 15, wherein the transmitting endpoint is configured to also provide an identity of the first token table to the receiving endpoint.

* * * * *